United States Patent [19]

Hussain et al.

[11] Patent Number: 5,219,255

[45] Date of Patent: Jun. 15, 1993

[54] MECHANICALLY LOCKED NUT ASSEMBLY

[75] Inventors: Ahmed Hussain, Brea; Bernd Leumer, Mission Viejo, both of Calif.

[73] Assignee: Bristol Industries, Brea, Calif.

[21] Appl. No.: 908,311

[22] Filed: Jul. 2, 1992

[51] Int. Cl.$^5$ ............................................. F16B 37/08
[52] U.S. Cl. .................................... 411/432; 411/361; 411/533
[58] Field of Search ............... 411/432, 533, 360, 313, 411/334, 333, 335, 336, 361, 371, 999, 337, 368, 924.1, 366

[56] References Cited

U.S. PATENT DOCUMENTS

| | | | |
|---|---|---|---|
| 3,209,806 | 10/1965 | Currier et al. | 411/361 |
| 3,209,807 | 10/1965 | Ryner | 411/361 |
| 3,386,771 | 6/1968 | Verdier et al. | 411/533 X |
| 3,421,563 | 1/1969 | Koss | 411/313 |
| 3,426,819 | 2/1969 | Estes et al. | 411/360 |
| 3,550,498 | 12/1970 | Briles | 411/432 |
| 3,805,863 | 4/1974 | Starr | 411/335 |
| 4,969,788 | 11/1990 | Goiny | 411/432 X |
| 4,979,857 | 12/1990 | Wing | 411/432 X |

FOREIGN PATENT DOCUMENTS 804893 2/1981 U.S.S.R. ............................ 411/533

Primary Examiner—Rodney M. Lindsey
Attorney, Agent, or Firm—Hawes & Fischer

[57] ABSTRACT

A nut assembly to be mechanically locked to a threaded bolt or pin of the type having an annular groove. The nut assembly comprises a threaded nut element to engage the bolt and a washer connected to the nut element. The washer has first and second coaxially aligned cylindrical walls extending therefrom. The first wall of the washer is deflected into contact with the nut element to prevent the disconnection of the nut element from the washer during handling prior to installation. In the as-packaged configuration of the nut assembly, the nut element is seated upon the second wall of and spaced from the washer. During installation, the nut element is drawn towards the washer to deflect the second wall radially into the annular groove of the bolt to mechanically lock the washer to the bolt and thereby prevent the inadvertent withdrawal of the bolt from the nut assembly due to vibration and similar mechanical forces.

15 Claims, 3 Drawing Sheets

MECHANICALLY LOCKED NUT ASSEMBLY

BACKGROUND OF THE INVENTION

1. Field of the Invention

This invention relates to a nut assembly having a nut element that is integrally connected to and movable rotationally and longitudinally relative to a washer so as to deform the washer and thereby mechanically lock the nut assembly to an associated bolt to prevent the inadvertent removal of the bolt from the nut assembly due to vibration and similar mechanical forces.

2. Background Art

The conventional two-piece fastener assembly 1 comprising a separate collar 2 and washer 4 is briefly described when referring to FIGS. 1 and 2 of the drawings. In the as-packaged configuration before installation, and is best shown in FIG. 1, the collar 2 includes a hollow body 6 having an internally threaded, hex-shaped head 8 at one end thereof and a relatively thin cylindrical shank 10 at the opposite end. The washer 4 also includes a hollow body 12 having a dish-shaped cavity 14 formed in one end thereof.

FIG. 2 shows the fastener assembly 1 of FIG. 1 after installation for securing a pair of sheet metal panels 60 and 70 together. More particularly, the collar 2 and washer 4 are first axially aligned with one another, and a commercially available (e.g. titanium) bolt or pin 16 is then inserted through holes in sheet metal panels 60 and 70 and into the hollow bodies 6 and 12 of collar 2 and washer 4 to connect said collar and washer together. The bolt 16 is of the type having a series of screw threads 18 at the forward end thereof, a flat head 20 at the opposite end, and a relatively narrow annular groove 22 located between the threaded end 18 and head 20. During tightening of the fastener assembly 1, the collar 2 is pulled towards washer 4 by bolt 16. Accordingly, the shank 10 of collar 2 is received within the cavity 14 of washer 4. A compressive force applied by washer 4 to shank 10 causes said shank to be bent or deflected inwardly towards the intermediate groove 22 of bolt 16. The position of the deflected shank 10 relative to the groove 22 forms a stop to prevent the bolt from withdrawing past shank 10 and inadvertently rotating out of engagement with threaded collar 2 as a consequence of vibration and similar mechanical forces to which the fastener assembly 1 is subjected.

The conventional two-piece fastener assembly 1 illustrated in FIGS. 1 and 2 is characterized by several shortcomings. First, there are a plurality of separate members (i.e. a collar 2 and a washer 4) to be handled which increases the assembly time and the possibility that fastener members may be lost or misplaced. Moreover, the washer 4 must first be oriented relative to collar 2 such that the shank 10 of collar 2 and the dish-shaped cavity 14 of washer 4 are aligned end-to-end one another during installation. Sometimes, the washer 4 is incorrectly installed with the cavity 14 facing away from shank 10, whereby to reduce the locking ability of the fastener assembly and the reliability for preventing removal of the bolt 16. What is more, it is relatively difficult to remove the bolt 16 and separate the washer 4 from the collar 2 when it is necessary to disconnect fastener assembly 1 from the panels 60 and 70 after installation.

SUMMARY OF THE INVENTION

In general terms, this invention relates to a nut assembly that is adapted to be mechanically locked to a threaded bolt or pin of the type having an annular groove formed therein for securing a pair of sheet metal panels, or the like. The nut assembly comprises a threaded nut element to engage the bolt and a washer connected to the nut element such that the nut element is movable relative to the washer. The washer has a pair of coaxially aligned, inner and outer cylindrical walls extending longitudinally therefrom.

In the as-packaged configuration of the nut assembly, the outer cylindrical wall of the washer is deflected radially inward to engage the nut element and prevent disconnection of the nut element from the washer. The nut element rests upon the inner cylindrical wall of the washer at a counterbore formed in the nut element such that a longitudinal gap is established between the washer and the nut element.

During installation of the nut assembly at the fastened structure, the bolt draws the nut element towards the washer to eliminate the gap therebetween. A compressive force is applied to the inner wall of the washer to correspondingly deflect the inner wall radially inward into the annular groove of the bolt. Accordingly, the deflected inner wall functions as a lock or stop which prevents the bolt from inadvertently rotating out of engagement with the nut assembly as a consequence of vibration and similar mechanical forces.

DETAILED DESCRIPTION

Figure 1:
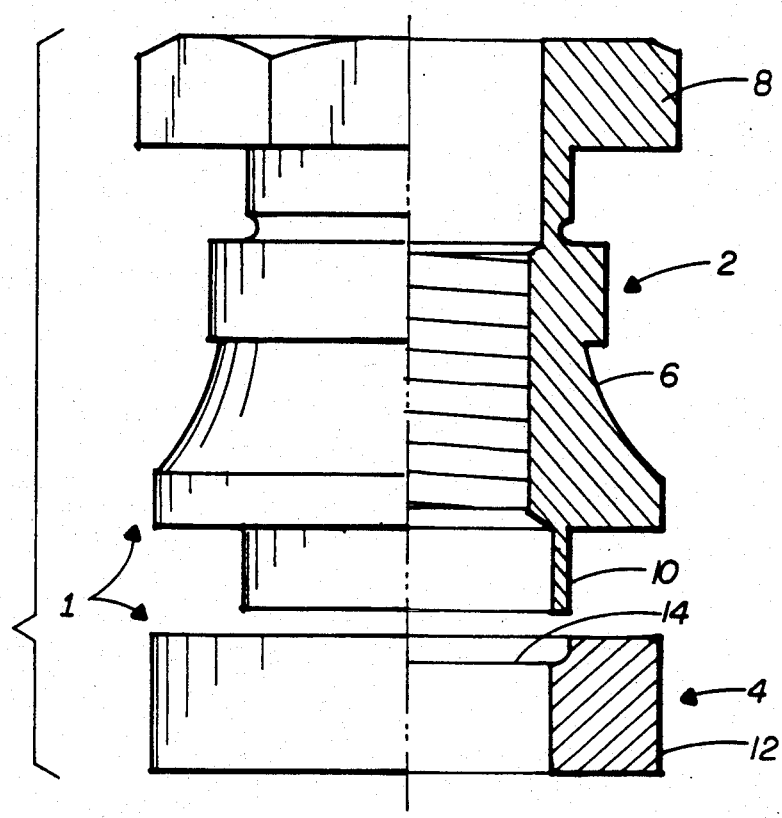
FIG. 1 is a partial cross section of a conventional multi-piece fastener assembly in the as-packaged configuration.
Figure 2:
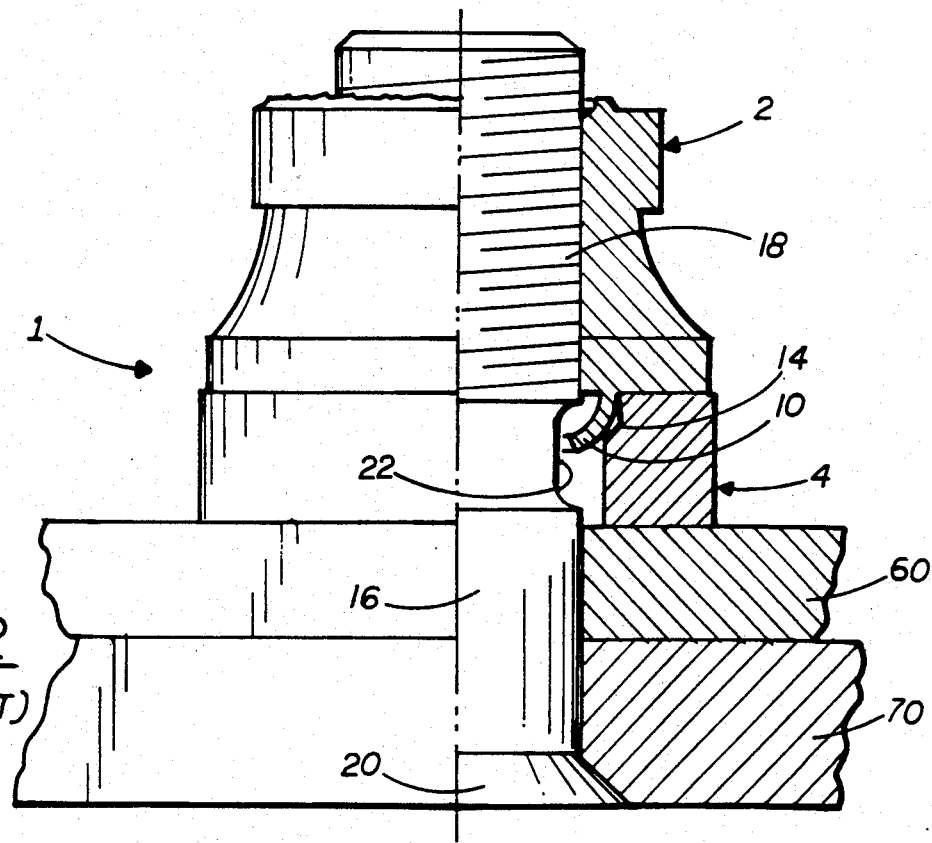
FIG. 2 shows the installation of the conventional fastener assembly of FIG. 1 with a bolt for securing two panels together.
Figure 3:
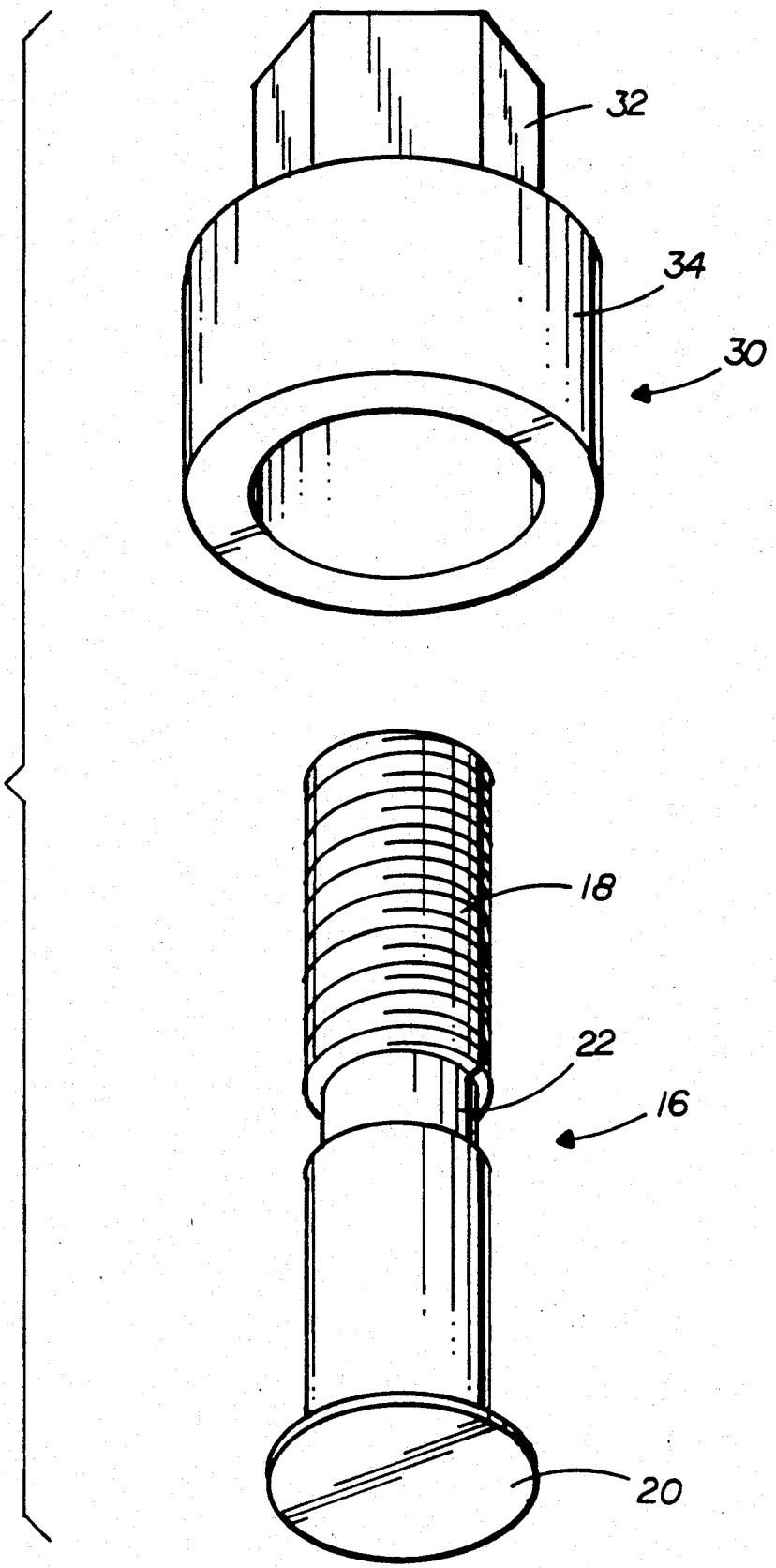
FIG. 3 is a perspective view of the nut assembly of the present invention aligned for receipt of a bolt.
Figure 4:
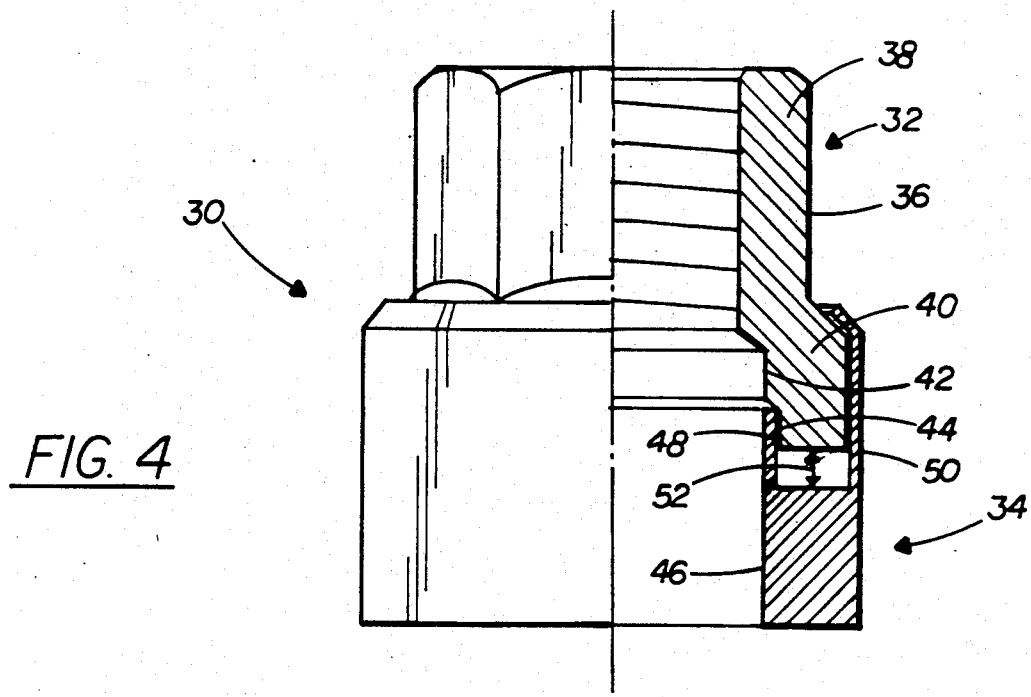
FIG. 4 is a partial cross section of the nut assembly of FIG. 3 in the as-packaged configuration.
Figure 5:
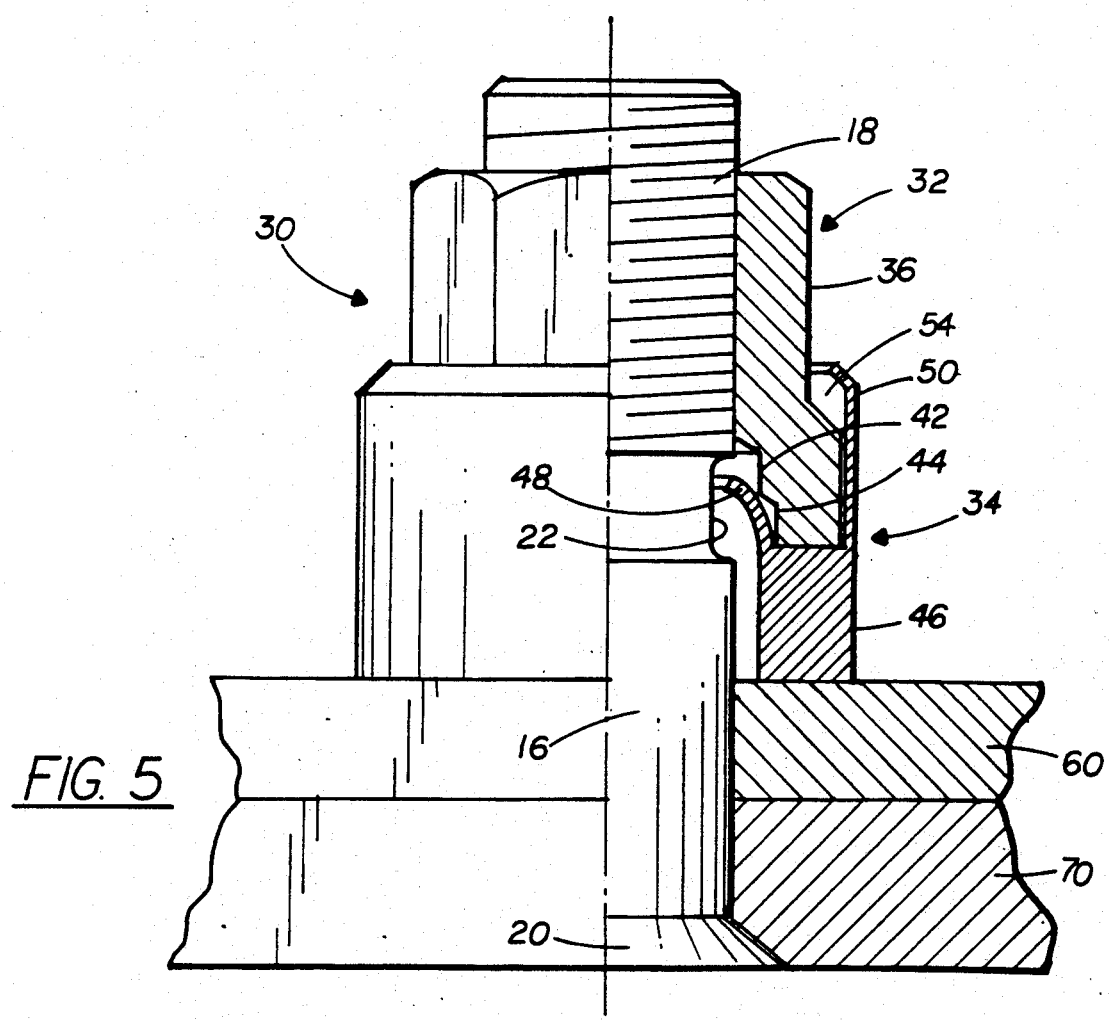
FIG. 5 shows the installation of the nut assembly of FIG. 3 mechanically locked to the bolt of FIG. 3 for securing two panels together.

An integral, nut assembly 30 which forms the present invention and which overcomes the problems inherent to the conventional fastener assembly 1 of FIGS. 1 and 2 is shown in FIGS. 3-5 of the drawings. That is to say, the nut assembly 30 is adapted to be more conveniently mated to the same commercially available bolt or pin 16 that has heretofore been associated with the conventional fastener assembly 1.

More particularly, and referring to FIG. 4, the nut assembly 30 is shown in the as-packaged configuration before installation comprising the interconnection of a nut element 32 and a washer 34. The nut element 32 includes a hollow body 36 that is preferably manufactured from steel, stainless steel, aluminum, or the like. The body 36 has an internally threaded, hex-shaped wrench pad 38 at one end thereof and a cylindrical base 40 at the opposite end. The diameter of base 40 of nut element 32 is slightly larger than the cross-corner dimension of the wrench pad 38. It is important to note that the base 40 is provided with contiguous, coaxially aligned upper and lower counter bores 42 and 44. The lower counter bore 44 of nut element 32 has a slightly larger diameter than the diameter of upper counter bore 42.

The washer 34, which is interconnected with nut element 32 in the as-packaged configuration of nut assembly 30, is preferably manufactured from steel, stainless steel, or the like. The washer 34 has a hollow body 46 and cylindrical inner and outer walls 48 and 5 projecting upwardly from body 46. Inner and outer walls 48 and 50 are spaced radially from one another, and the outer wall 50 is longer than inner wall 48. In the as-packaged configuration of nut assembly 30, the base 40 of nut element 32 is received between the radially spaced inner and outer walls 48 and 50 of washer 34, such that the inner wall 48 is received in the lower counter bore 44 of base 40, and the outer wall 50 surrounds and embraces base 40. Thus, it can be seen that the nut element 32 rests upon the top of washer 34 (i.e. on inner wall 48), such that a small, longitudinally extending gap 52 of approximately 0.03 inches is created between the body 46 of washer 34 and the base 40 of nut element 32. The nut assembly 30 is completed when the top of the cylindrical outer wall 50 of washer 34 is deflected radially inward during manufacture around the base 40 of nut element 32 to form a captive washer-type assembly. The foregoing may be accomplished by means of a well-known staking, crimping or similar technique.

FIG. 5 of the drawings shows the integral nut assembly 30 of FIG. 4 after installation for securing a pair of sheet metal panels 60 and 70 together. More particularly, the bolt 16 of FIG. 3 is inserted through holes in a pair of sheet metal panels 60 and 70 and into the hollow bodies 36 and 46 of nut element 32 and washer 34. As was described when referring to FIG. 2, the bolt 16 has a series of screw threads 18 at the forward end thereof to engage the screw threads of nut element 32, a flat head 20 at the opposite end, and a relatively narrow angular groove 22 located between the threaded end 18 and head 20.

During tightening of the nut assembly 30 against panels 60 and 70, the nut element 32 is rotated towards the washer 34 by bolt 16. Accordingly, the base 40 of nut element 32 moves through and eliminates the longitudinally extending gap (designated 52 in FIG. 4) between nut element 32 and washer 34, whereby a space 54 is formed between the deflected top of outer wall 50 of washer 34 and nut element 32. Moreover, the inner wall 48 of washer 34 is received within the lower counter bore 44 of nut element 32, such that a compressive force is applied by nut element 32 to inner wall 48 to cause inner wall to be bent or deflected through the upper counter bore 42 and into the intermediate groove 22 of bolt 16. The position of deflected inner wall 48 within the groove 22 forms a mechanical lock of washer 34 to bolt 16 to prevent the bolt from withdrawing past deflected wall 48 and inadvertently rotating out of engagement with the threaded nut element 32 as a consequence of vibration, and the like. Therefore, if the nut assembly 30 is used on a jet aircraft the probability is greatly reduced that the bolt 16 could become free of nut assembly 30 and ingested into a jet engine.

The integral nut assembly 30 of the present invention is an improvement over the multi-piece fastener assembly 1 of FIGS. 1 and 2. That is, the integral nut assembly 30 is easier to handle than the multi-piece assembly 1 having separate fastener members. The nut element 32 and washer 34 of the integral nut assembly 30 require no manual alignment by a workman, making installation relatively quick and easy and assuring a reliable connection with bolt 16 to prevent loosening of the bolt and separation of the fastened structure (of FIG. 5). Accordingly, the cost of installing the nut 30 herein disclosed is significantly less than the cost incurred to install the conventional fastener assembly 1 of FIGS. 1 and 2.

It will be apparent that while a preferred embodiment of the invention has been shown and described, various modifications and changes may be made without departing from the true spirit and scope of the invention.

Having thus set forth a preferred embodiment of the invention, what is claimed is:

1. A nut to engage a bolt and including a longitudinal axis, a hollow washer having a first longitudinally extending wall projecting therefrom and a hollow nut element connected to said washer and seated upon said first wall so that a longitudinal gap exists between said nut element and said washer, said nut element being movable longitudinally towards said washer and through said gap therebetween to deflect said first wall radially inward relative to said longitudinal axis and into locking contact with the bolt.

2. The nut recited in claim 1, including a second wall projecting longitudinally from said washer and deflected radially relative to the longitudinal axis of said nut into contact with said nut element to prevent the disconnection of said nut element from said washer.

3. The nut recited in claim 2, wherein said nut element has a threaded head of relatively small diameter and a base of relatively wide diameter, the second wall of said washer deflected radially into contact with said nut element between said head and said base thereof.

4. The nut recited in claim 2, wherein the second wall of said washer surrounds the base of said nut element, one end of said second wall connected to said washer and the opposite end of said second wall deflected radially inward into contact with said nut element between the head and base thereof.

5. The nut recited in claim 1, wherein said nut element has a first counterbore in which to receive the first wall of said washer when said nut element is seated upon said first wall.

6. The nut recited in claim 5, wherein said nut element has a second counterbore longitudinally adjacent said first counterbore, the first wall of said washer being deflected through said second counterbore when said nut element is moved longitudinally towards said washer.

7. The nut recited in claim 2, wherein the length of said first wall if shorter than the length of said second wall.

8. A combination nut and bolt;
said bolt having a screw threaded end, a head opposite said screw threaded end, and an annular groove between said screw threaded end and said head; and
said nut having a longitudinally extending axis, a hollow screw threaded nut element to engage the screw threaded end of said bolt, a hollow washer surrounding said bolt, and a first wall projecting form said washer to engagement with said nut element and being deflectable radially inward relative to the longitudinal axis of said nut for receipt within the annular groove of the bolt to mechanically lock said nut to said bolt, said nut element movable longitudinally towards said washer to deflect said first wall towards said bolt.

9. The combination recited in claim 8, wherein the washer of said nut has a second wall projecting therefrom and spaced radially form said first wall, said second wall deflected radially inward relative to the longitudinal axis of said nut into engagement with said nut element to connect said nut element to said washer.

10. The combination recite din claim 9, wherein each of said first and second walls has respective first and opposite ends, the first ends of said first and second walls connected to said washer, the opposite end of said first wall being deflectable radially inward relative to the longitudinal axis of said nut for receipt within the annular groove of the bolt, and the opposite end of said second wall deflected radially inward relative to said longitudinal axis and into contact with said nut element.

11. The nut recited in claim 10, wherein the length of said first wall between the respective first and opposite ends thereof is shorter than the length of said second wall between the respective first and opposite ends thereof.

12. The combination recited in claim 10, wherein said nut element is seated upon the opposite end of said first wall such that a longitudinal gap is established between said nut element and said washer, said nut element is movable longitudinally towards said washer to eliminate said gap therebetween and deflect the opposite end of said first wall radially inward into the annular groove of the bolt to prevent the withdrawal of said bolt from said nut element.

13. The combination recited in claim 12, wherein said nut element has a first counterbore in which to receive the opposite end of said first wall when said nut element is seated upon said first wall.

14. The combination recited in claim 13, wherein said nut element has a second counterbore longitudinally adjacent said first counterbore, the opposite end of said first wall being deflected through said second counterbore and into the annular groove of said bolt when said nut element is moved longitudinally towards said washer.

15. For interconnection with a bolt having a screw threaded end, a head opposite said screw threaded end, and an annular groove between said screw threaded end and said head, a nut having a longitudinal axis and comprising:

a threaded nut element to receive the threaded end of said bolt;

a washer having first and second longitudinally extending cylindrical walls coaxially aligned with and spaced from one another, said first wall deflected radially into engagement with said nut element to connect said nut element to said washer, and said nut element seated upon said second wall to establish a longitudinal gap between said nut element and said washer; and said nut element movable longitudinally towards said washer to eliminate the gap therebetween and deflect said second wall radially into the annular groove of the bolt to thereby prevent the withdrawal of said bolt from said nut element and mechanically lock said nut to said bolt.

* * * * *